(12) United States Patent
Liang et al.

(10) Patent No.: US 10,050,538 B2
(45) Date of Patent: Aug. 14, 2018

(54) FLYBACK CONVERTER AND CONTROLLING METHOD THEREOF

(71) Applicant: NATIONAL CHENG KUNG UNIVERSITY, Tainan (TW)

(72) Inventors: Tsorng-Juu Liang, Tainan (TW); Kai-Hui Chen, Tainan (TW); Jiann-Fuh Chen, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 0 days.

(21) Appl. No.: 15/707,067

(22) Filed: Sep. 18, 2017

(65) Prior Publication Data

US 2018/0083541 A1    Mar. 22, 2018

(30) Foreign Application Priority Data

Sep. 19, 2016    (TW) .............................. 105130226 A

(51) Int. Cl.
*H02M 3/335* (2006.01)
*H02M 3/338* (2006.01)
(Continued)

(52) U.S. Cl.
CPC ..... *H02M 3/33507* (2013.01); *H02M 3/3385* (2013.01); *H02M 3/33515* (2013.01);
(Continued)

(58) Field of Classification Search
CPC .................................................... H02M 3/335
See application file for complete search history.

(56) References Cited

U.S. PATENT DOCUMENTS

2017/0077818 A1* 3/2017 Werner ............ H02M 3/33507
2017/0196063 A1* 7/2017 Zhu ................... H05B 33/0845
(Continued)

*Primary Examiner* — Nguyen Tran
*Assistant Examiner* — Trinh Q Dang
(74) *Attorney, Agent, or Firm* — Haynes and Boone, LLP

(57) ABSTRACT

A flyback converter includes a primary side circuit, a secondary side circuit and a controller. The primary side circuit includes a primary winding and a main switch electrically connected to the primary winding. The secondary side circuit includes a secondary winding and an output diode electrically connected to the secondary winding and having a parasitic electrical parameter. The controller generates a correcting parameter for counteracting an effect on an output voltage of the flyback converter from the parasitic electrical parameter, wherein the parasitic electrical parameter is an equivalent series-connection resistance $R_d$ of the output diode and the secondary side circuit, and the correcting parameter is calculated based on the formula $$\frac{n_p}{n_s} I_{ini} R_d,$$

wherein $n_p$ denotes a turns number of the primary winding, $n_s$ denotes a turns number of the secondary winding, and $I_{ini}$ denotes an initial current value which is detected when the main switch is conducted.

20 Claims, 6 Drawing Sheets

(51) Int. Cl.
*H02M 1/00* (2006.01)
*H02M 1/44* (2007.01)

(52) U.S. Cl.
CPC ... *H02M 3/33553* (2013.01); *H02M 3/33576* (2013.01); *H02M 1/44* (2013.01); *H02M 2001/0025* (2013.01); *H02M 2001/0035* (2013.01)

(56) References Cited

U.S. PATENT DOCUMENTS

| | | | |
|---|---|---|---|
| 2017/0214322 A1* | 7/2017 | Lin | H02M 3/33576 |
| 2017/0264206 A1* | 9/2017 | Rana | H02M 1/083 |
| 2017/0288553 A1* | 10/2017 | Fahlenkamp | H02M 3/33515 |
| 2018/0007751 A1* | 1/2018 | Gritti | H02M 1/08 |
| 2018/0034378 A1* | 2/2018 | Lin | H02M 3/33523 |

\* cited by examiner

FLYBACK CONVERTER AND CONTROLLING METHOD THEREOF

CROSS REFERENCE TO RELATED APPLICATION

This application claims the benefit of Taiwan's Patent Application No. 105130226, filed on Sep. 19, 2016, at Taiwan's Intellectual Property Office, the disclosures of which are incorporated herein in their entirety by reference.

TECHNICAL FIELD

Embodiments in the present disclosure are related to a flyback converter and a controlling method thereof, and more particularly to a flyback converter including a voltage-adjusting parameter generating module and a current-adjusting parameter generating module and controlling methods thereof.

BACKGROUND

FIG. 1 is a schematic circuit diagram showing a typical flyback converter system 1 for controlling a primary side circuit thereof in the prior art. The flyback converter system 1 includes a DC input power source 11, a flyback converter (12 and 14) and an LED diode module 13. The DC input power source 11 provides a DC input voltage Vin. The flyback converter (12 and 14) includes a main circuit 12 and a controller 14. The LED diode module 13 includes a plurality of LEDs. The main circuit 12 of the flyback converter (12 and 14) includes a transformer 121, a main switch S, an output diode D0, an output C0 and a current detecting resistor Rcs. The transformer 121 includes a primary winding 1211, a secondary winding 1212, a magnetizing inductance Lm and an auxiliary winding 1213. The controller 14 includes a current adjuster 141, a zero current detector (ZCD) circuit 142, a pulse width modulation (PWM) generator 143, a voltage adjuster 144, a gate driving circuit 145, a current sensor (CS) 146, a voltage sensor (VS) 147, a controller power source vcc and a ground GND. The primary winding 1211 of the transformer 121 has a primary winding turns number np and a primary winding voltage Vpri. The secondary winding 1212 of the transformer 121 has a secondary winding turns number ns and a secondary winding voltage Vsec. The auxiliary winding 1213 has a winding turns number naux and an auxiliary winding voltage Vaux crossing over. The main switch S has a gate voltage Vgs. The current detecting resistor Rcs has a voltage Vcs. The output capacitor C0 has a voltage Vo, i.e., the flyback converter system 1 has an output voltage Vo. In addition, the magnetizing inductance Lm has a current iLm flowing through; the main switch S has a current Is flowing through; the output diode D0 has a current iD flowing through; and the flyback converter system 1 has an output current Io.

The main circuit 12 feedbacks an output information of the flyback converter (12 and 14), by using the auxiliary winding 1213 and the controller 14, to a primary side circuit, which includes the primary winding 1211, the magnetizing inductance Lm, the main switch S and the current detecting resistor Rcs. The controller 14 modulates a duty cycle of the main switch S to achieve a purpose of controlling method for the output current Io and the output voltage Vo after processing the relevant output information.

FIG. 2 is a timing diagram showing typical waveforms formed in the flyback converter system 1 for controlling the primary side circuit thereof shown in FIG. 1 in the prior art. The output voltage Vo is controlled by using the auxiliary voltage Vaux to control the primary side circuit. The relevant formula is as the following equation (1), where Rd is an equivalent series-connection resistance, VF is a conducting voltage drop of the output diode. Based on FIG. 1 and equation (1), it can be seen that the auxiliary voltage Vaux detected by the auxiliary winding 1213 is affected by a parasitic characteristic of the output diode D0. Therefore, an operating mode for the flyback converter (12 and 14) is always restricted in a DCM (discontinuous current mode) when the primary side circuit is controlled. In FIG. 2, the auxiliary voltage Vaux is detected at the time t=ts in the DCM, wherein the item iD(t)Rd will be zero, the conducting voltage drop VF is about a constant, and the auxiliary voltage Vaux is simplified for a compensation of the output voltage Vo.

$$v_{aux}(t) = \frac{n_{aux}}{n_s}(V_O + i_D(t)R_d + V_F) \qquad (1)$$

Regarding controlling the output current Io, it can be derived from the following equation (2), by detecting a peak current Ipk at a time the main switch is turned off and by measuring a conducting duration Tdis of the output diode D0. In the equation (2), Ts is a switching cycle of the main switch, and iD is a current flowing through the output diode Do. However, the formula in the equation (2) still needs to be used on the condition that the operating mode of the flyback converter (12 and 14) is restricted to the DCM. Because the current iD flowing through the output diode Do in the Equation (2) is not zero, resulting in another non-zero initial current value Iini existing in the item (IPK/2) of the equation (2) when the main switch S is turned on.

$$I_o = \frac{1}{T_s}\int_0^{T_s} i_d dt = \frac{T_{dis}}{T_s}\left(\frac{I_{PK}}{2}\right)\frac{n_p}{n_s} \qquad (2)$$

The technique applied to the primary side circuit can avoid adding control circuit components in the secondary side circuit, reduce component costs effectively and achieve relatively low standby power consumption. However, it is worth thinking deeply about how to improve the technique of controlling the primary side circuit and its relevant controlling method in order to achieve the purpose of controlling the output voltage and the output current whenever the flyback converter system 1 is operated in the DCM or a CCM (continuous current mode).

Therefore, the inventor is in view of drawbacks of the prior art, thinks an idea to improve the prior art, and invents the present application "flyback converter and controlling method thereof".

SUMMARY OF EXEMPLARY EMBODIMENTS

The purpose of the present application is to provide a flyback converter and a controlling method thereof, in order that a power source converter which uses the flyback converter and the controlling method can achieve the following effects. The power source converter can control the output voltage and the output current whenever it is operated in the DCM or the CCM, keep the technique to control the primary side circuit and save the control circuit component in the secondary side circuit, reduce component costs effectively, and achieve relatively low standby power consumption.

In accordance with one embodiment of the present disclosure, a flyback converter is disclosed. The flyback converter having an output current and an output voltage includes a transformer, a main switch, an output diode and a controller. The transformer includes a primary winding, a secondary winding and an auxiliary winding. The main switch is electrically connected to the primary winding. The output diode is electrically connected to the secondary winding. The controller includes a current-adjusting parameter generating module, a voltage-adjusting parameter generating module, a current adjuster and a voltage adjuster. The current-adjusting parameter generating module receives an initial current value at a time when the main switch is turned on, a peak current value at a time when the main switch is turned off, a conducting duration of the output diode and a first turns number ratio of secondary winding to primary winding to generate a current-adjusting parameter. The voltage-adjusting parameter generating module receives the initial current value, the first turns number ratio a second turns number ratio of the auxiliary winding to the secondary winding, an output voltage value of the flyback converter, a conducted voltage drop value of the output diode and an equivalent resistance of the output diode to generate a voltage-adjusting parameter. The current adjuster adjusts the output current of the flyback converter according to the current-adjusting parameter. The voltage adjuster adjusts the output voltage of the flyback converter according to the voltage-adjusting parameter.

In accordance with one embodiment of the present disclosure, a flyback converter is disclosed. The flyback converter includes a primary side circuit, a secondary side circuit and a controller. The primary side circuit includes a primary winding and a main switch electrically connected to the primary winding. The secondary side circuit includes a secondary winding and an output diode electrically connected to the secondary winding and having a parasitic electrical parameter. The controller generates a correcting parameter for counteracting an effect on an output voltage of the flyback converter from the parasitic electrical parameter, wherein the parasitic electrical parameter is an equivalent series-connection resistance $R_d$ of the output diode and the secondary side circuit, and the correcting parameter is calculated based on the formula $$\frac{n_p}{n_s} I_{ini} R_d.$$

wherein $n_p$ denotes a turn number of the primary winding, $n_s$ denotes a turns number of the secondary winding, and $I_{ini}$ denotes an initial current value which is detected when the main switch is conducted.

In accordance with a further embodiment of the present disclosure, the present invention discloses a method of controlling a flyback converter. The flyback converter has an output voltage, a primary side circuit and a secondary side circuit, wherein the primary side circuit includes a primary winding and a main switch electrically connected to the primary winding, and the secondary side circuit includes a secondary winding, the method of controlling the flyback converter includes: providing an output diode having a parasitic electrical parameter; and providing a controller generating a correcting parameter for counteracting an effect on the output voltage of the flyback converter from the parasitic electrical parameter, wherein the parasitic electrical parameter is an equivalent series-connection resistance $R_d$ of the output diode and the secondary side circuit, and the correcting parameter is calculated based on the formula $$\frac{n_p}{n_s} I_{ini} R_d,$$

wherein $n_p$ denotes a turn number of the primary winding $n_s$ denotes a turn number of the secondary winding, and $I_{ini}$ denotes an initial current value which is detected when the main switch is conducted.

The above embodiments and advantages of the present invention will become more readily apparent to those ordinarily skilled in the art after reviewing the following detailed descriptions and accompanying drawings.

DETAILED DESCRIPTION OF THE PREFERRED EMBODIMENTS

Please refer to all Figs. of the present invention when reading the following detailed description, wherein all Figs. of the present invention demonstrate different embodiments of the present invention by showing examples, and help the skilled person in the art to understand how to implement the present invention. The present examples provide sufficient embodiments to demonstrate the spirit of the present invention, each embodiment does not conflict with the others, and new embodiments can be implemented through an arbitrary combination thereof, i.e., the present invention is not restricted to the embodiments disclosed in the present specification.

Figure 1:
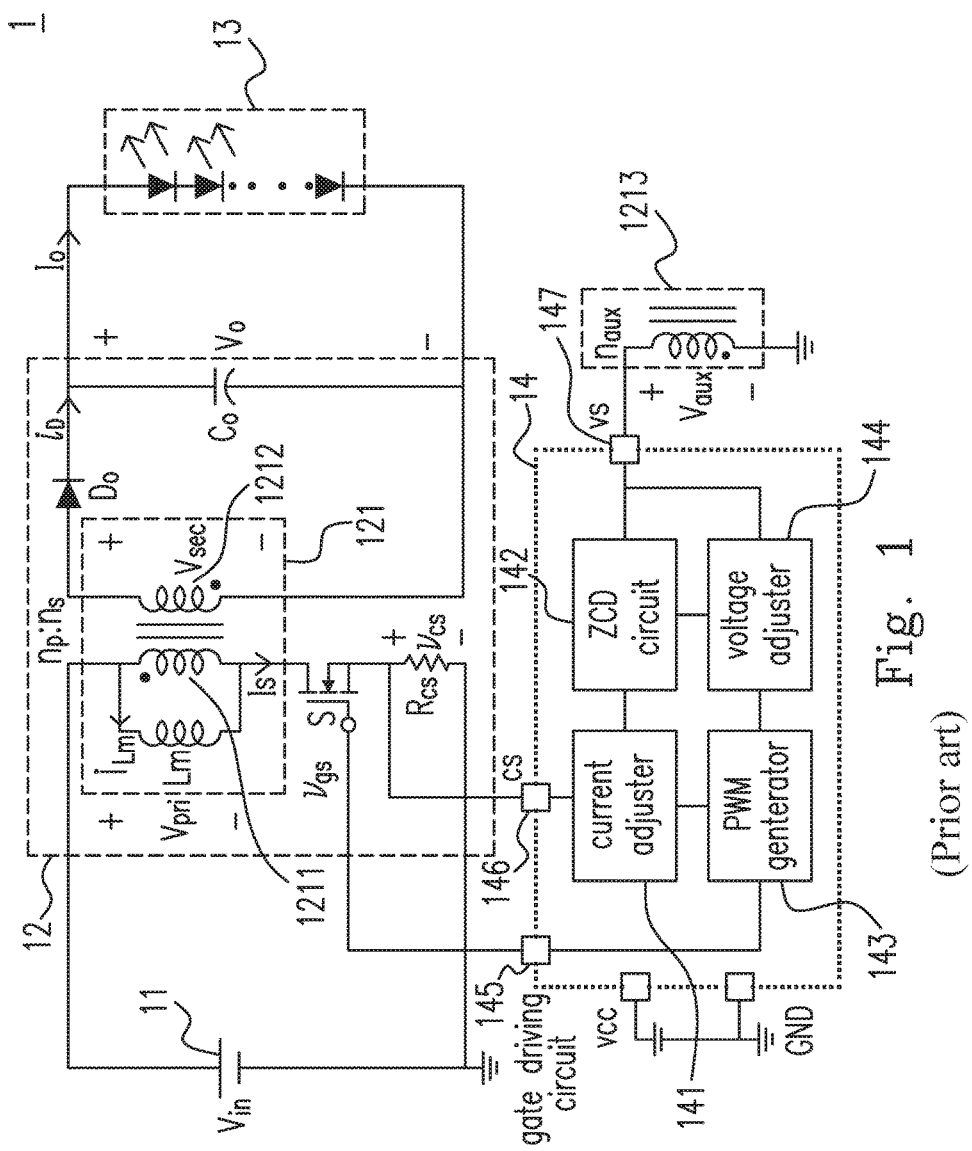
FIG. 1 is a schematic circuit diagram showing a typical flyback converter system for controlling a primary side circuit thereof in the prior art.
Figure 2:
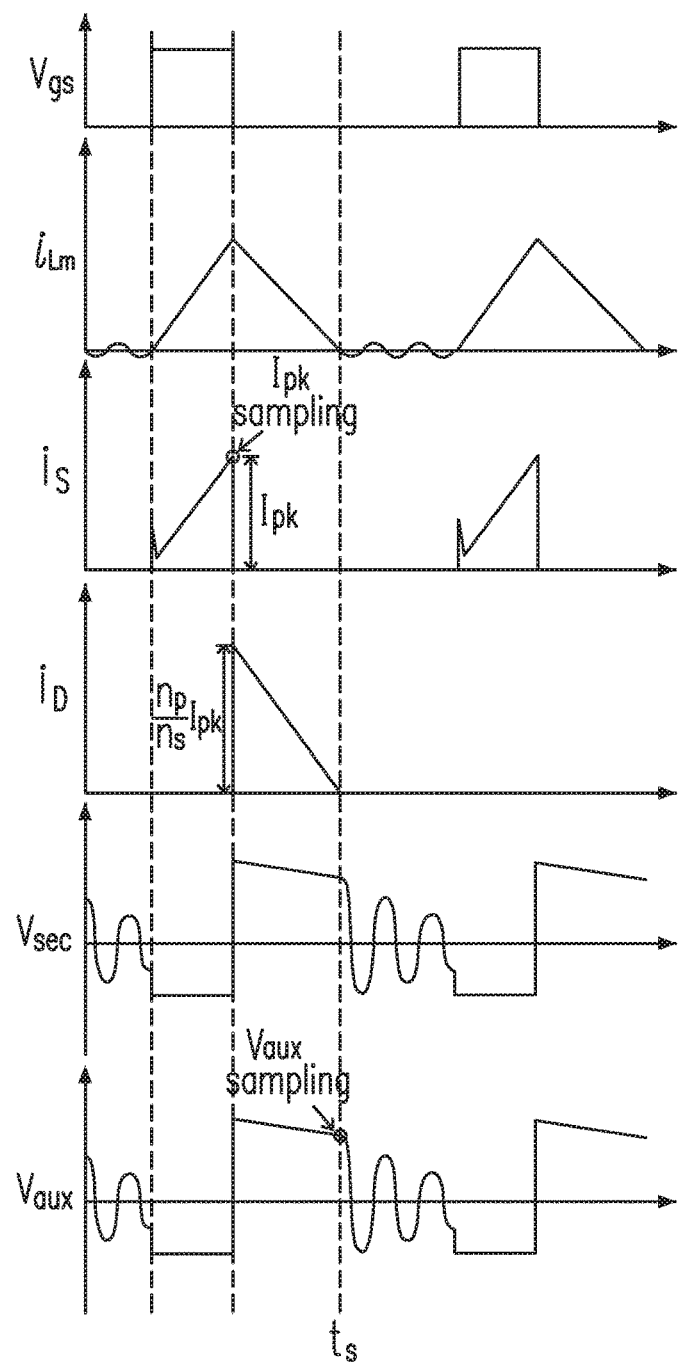
FIG. 2 is a timing diagram showing typical waveforms formed in the flyback converter system for controlling the primary side circuit shown in FIG. 1 in the prior art.
Figure 3:
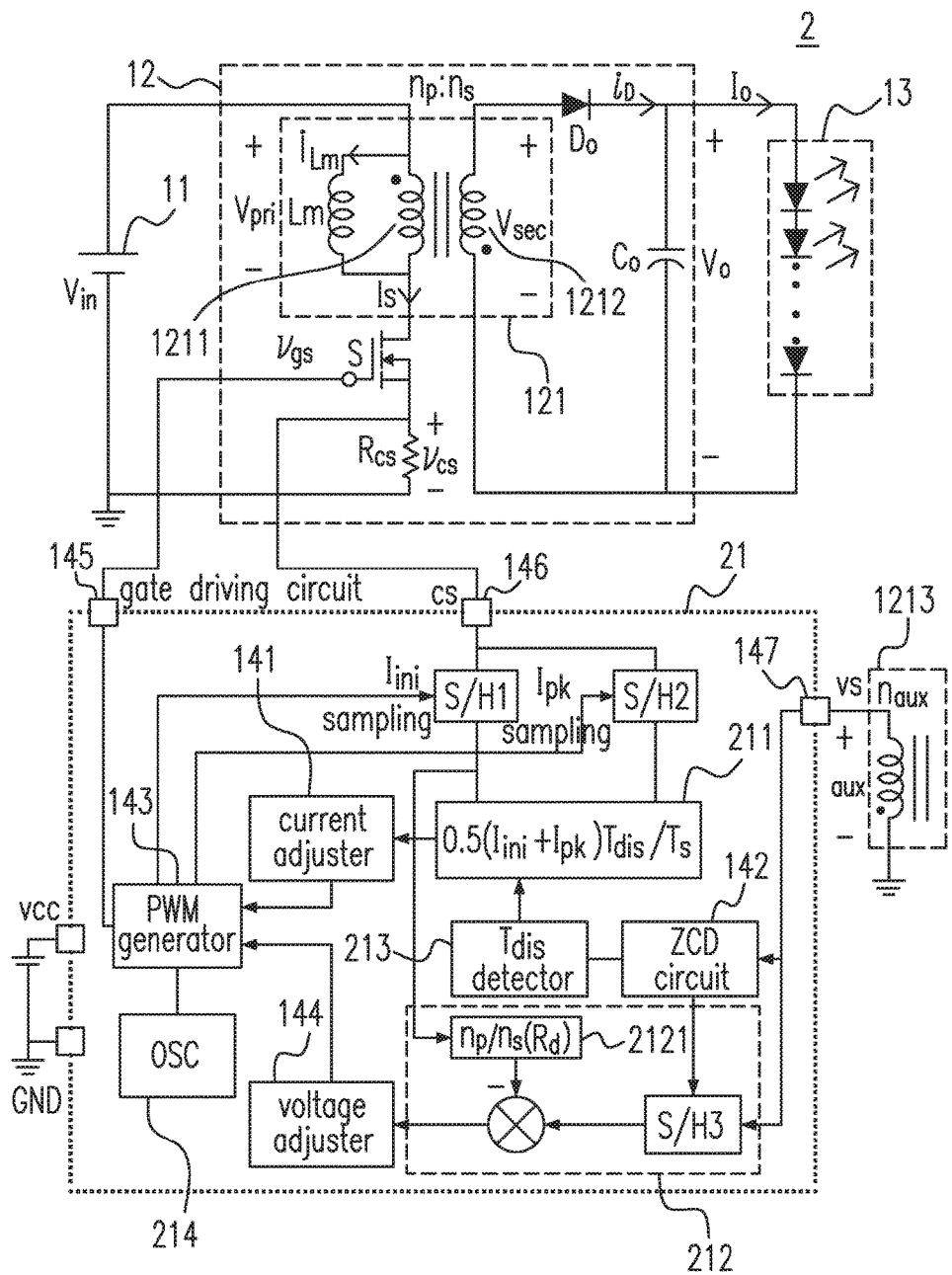
FIG. 3 is a schematic circuit diagram showing a flyback converter system according to the preferred embodiment of the present disclosure.

Please refer to FIG. 3, which is a schematic circuit diagram showing a flyback converter system 2 according to the preferred embodiment of the present disclosure. In FIG. 3, the flyback converter system 2 includes the DC input power source 11 and the LED module 13 as shown in FIG. 1, and further includes a flyback converter, which includes the main circuit 12 as shown in FIG. 1 and a controller 21 as shown in FIG. 3. In addition to the components 141-147, vss and GND in the controller 14, the difference between the controller 21 in FIG. 2 and the controller 14 in FIG. 1 is that the controller 21 further includes a current-adjusting parameter generating module 211, a voltage-adjusting parameter generating module 212, a Tdis detector 213, an oscillator 214, a first sample and hold circuit S/H1, a second sample and hold circuit S/H2 and a third sample and hold circuit S/H3. The voltage-adjusting parameter generating module 212 includes a detection-error generating module 2121 which measures a current offset resulting from a diode current.

Figure 4A:
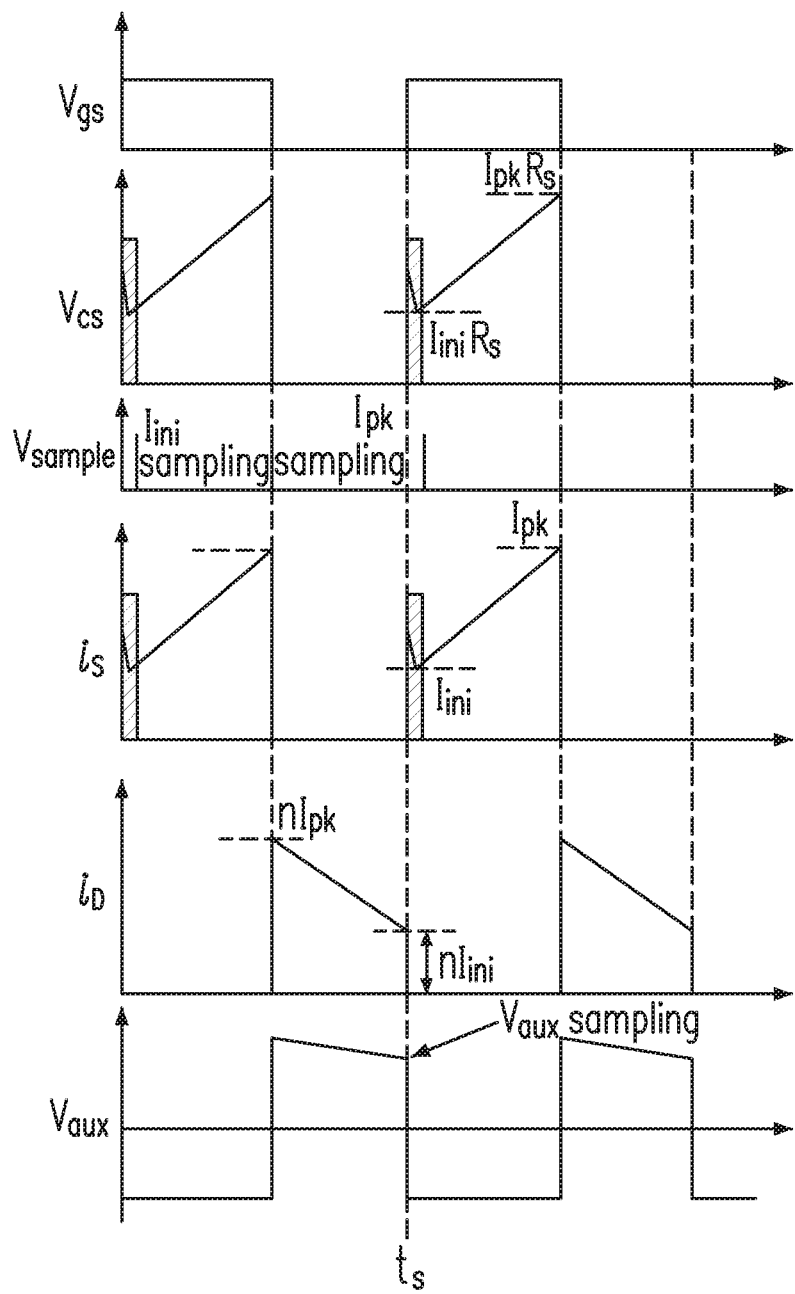
FIG. 4(a) is a timing diagram showing waveforms formed in the flyback converter system operated in DCM shown in FIG. 3 according to the preferred embodiment of the present disclosure.
Figure 4B:
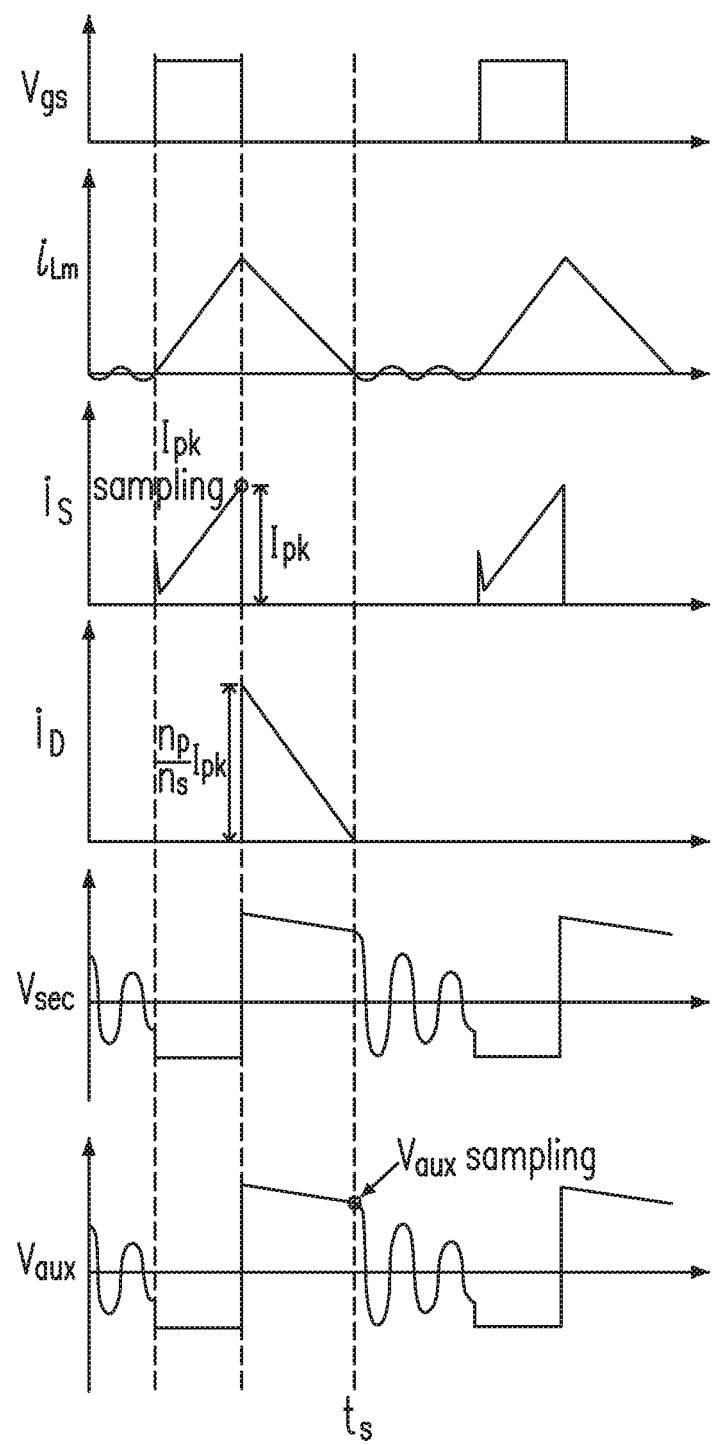
FIG. 4(b) is a timing diagram showing waveforms formed in the flyback converter system operated in CCM shown in FIG. 3 according to the preferred embodiment of the present disclosure.

The present application provides a control method of the flyback converter system 2. When the flyback converter system 2 is operated in the CCM and the DCM, the flyback converter system 2 forms two main sets of waveforms as shown in FIGS. 4(a) and 4(b) respectively. In FIG. 4(a), the waveform Vsample shows control signals for sampling the voltage Vcs as shown in FIG. 3, wherein the controller 21 generates a control signal at a specific time to sample the voltage Vcs to retrieve a voltage value denoted as a Vcs value, representing an initial current Iinit or a peak current Ipk at the specific time when the control signal is transmitted for sampling the voltage Vcs. As shown in FIG. 3, at the time the main switch S of the flyback converter system 2 is turned on, the initial current Iinit flowing through the main switch S is detected; at the time the main switch is turned off, the peak current Ipk flowing through the main switch S is detected. Furthermore, by detecting a conducting duration Tdis of the output diode Do, the output current Io can be derived from the following formula (3):

$$I_o = \frac{1}{T_s}\int_0^{T_s} i_d dt = \frac{T_{dis}}{T_s}\left(\frac{I_{ini} + I_{PK}}{2}\right)\frac{n_p}{n_s} \qquad (3)$$

Under a condition that the output voltage is detected by using the concept of the present application, a mapping voltage Vaux of the auxiliary winding 1213 can be derived from the following formula (4):

$$v_{aux}(t_s) = \frac{n_{aux}}{n_s}(V_o + nI_{ini}R_d + V_F) \qquad (4)$$

In formula (4), Ts denotes an operating cycle of the main switch S, id denotes a value of a current flowing through the output diode Do, $T_{dis}$ denotes a conduction time of the output diode Do, Iini denotes an initial current value at the time when the main switch S starting conducting, Ipk denotes a peak current value detected at the time when the main switch S ends conducting, np denotes a turns number of the primary winding 1211, ns denotes a turns number of the secondary winding 1212, naux denotes a turns number of the auxiliary winding 1213, Vo denotes an output voltage value of the flyback converter (12 and 21), n denotes a turns ratio of the secondary winding 1212 to the primary winding 1211, $R_d$ denotes an equivalent series-connection resistance of the output diode Do and a secondary side circuit, and $V_F$ denotes a conducted voltage drop value of the output diode Do. The current-adjusting parameter generating module 211 is a feedback current-trimming module, and the voltage-adjusting parameter generating module 212 is a feedback voltage-trimming module.

Comparing the aforementioned formula (1) with the formula (3), it is found that the aforementioned formula (1) and the formula (3) will be the same when the flyback converter system 2 is operated in the DCM, wherein the initial current Iini is detected to be zero. Similarly, comparing the formula (2) with formula (4), it is found that the aforementioned formula (2) and the formula (4) will be the same when the flyback converter system 2 is operated in the DCM, wherein the initial current Iini is detected to be zero. In view of the above descriptions, it is known that circuits of the controller 21 designed by using the concept of the formula (3) and the formula (4) are not affected by the operating mode of the flyback converter system 2 whenever in the DCM or the CCM, and thus the purpose of controlling the output current Io and the output voltage Vo can be achieved in one of the DCM and CCM.

A. Control of the Output Current Io:

In the CCM operation, the output current Io can be derived from the formula (3). A portion of parameters, including Tdis, Iini and Ipk in the formula (3) is necessary to be detected; but np and ns are constant (when the circuit is built, np and ns are fixed). The initial current Iini denotes an initial current value detected at the first moment after the main switch S is turned on for a first predetermined duration to avoid a surge. Because the main switch S has the surge, especially at the time when the main switch S is turned on, it will cause severe control errors by using the detected initial current value Iini. $I_{PK}$ is detected at the second moment when the main switch S is turned off. $T_{dis}$ is a conducting period of the output diode Do. Ts is a operating cycle of the main switch S. After the main switch S is turned off, a current energy in the magnetizing inductance Lm will be transmitted to the secondary side circuit. After a current $i_{Lm}$ inside the magnetizing inductance Lm is down to zero, the output diode Do is caused to stop conducting immediately.

B. Control of the Output Voltage:

Reviewing the formula (1):

$$v_{aux}(t) = \frac{n_{aux}}{n_s}(V_o + i_D(t)R_d + V_F),$$

when the flyback converter (12 and 21) is operated in the CCM, the auxiliary voltage Vaux will be detected before the main switch S is turned on at next conducting time. The current $i_D$ flowing through the output diode Do is not zero because the flyback converter system 2 is operated in the CCM. Because an initial current information Iini will be detected at the time when the main switch S is turned on, this initial current information $I_{ini}$ can be used to represent a diode current value iD(ts) at the time ts.

$$i_D(ts)=(np/ns)I_{ini} \qquad (5)$$

According to the equation (5), the auxiliary voltage Vaux detected at the time ts can be written as the following equation (6):

$$v_{aux}(t_s) = \frac{n_{aux}}{n_s}\left(V_o + \frac{n_p}{n_s}I_{ini}R_d + V_F\right) \qquad (6)$$

The above detection errors resulting from the current of the output diode Do can be corrected because the initial current value Iini is detected. If the item $$\frac{n_p}{n_s}I_{ini}R_d$$

in the equation (6) can be eliminated, the flowing equation (7) can be obtained:

$$v_{aux}(t_s) = \frac{n_{aux}}{n_s}(V_o + V_F) \quad (7)$$

In the equation (7), only the conducted voltage drop value VF of the output diode Do needs to be considered to obtain the auxiliary voltage Vaux. However, the conducted voltage drop value VF is in general a constant, and thus the correcting technique employing constant offset can fix such a problem.

In FIG. 3, the first sample and hold circuit S/H1 is used for sampling of the initial current value Iini, and provides each of the current-adjusting parameter generating module 211 and the voltage-adjusting parameter generating module 212 with the initial current value Iini. The second sample and hold circuit S/H2 is used for sampling of the peak current value Ipk, and provides the current-adjusting parameter generating module 211 with the peak current value Ipk. The Tdis detector 213 is used to detect the conduction duration Tdis value, provides the current-adjusting parameter generating module 211 with the conduction duration Tdis value, and outputs a current-adjusting parameter to the current adjuster 141, so as to generate the output current value Io as shown in FIG. 3. No matter in the CCM or the DCM, the ZCD circuit 142 can detect the timing ts. A voltage detector 147 is used to detect the voltage vs (ts) that maps to the output voltage Vo. The third sample and hold circuit S/H3 is used to preserve a value of the voltage vs (ts) for use in a voltage feedback circuit. The detection-error generating module 2121, formed resulting from the current $i_D$ of the output diode Do, is used to receive the initial current Iini value, and then generates the value $$\frac{n_p}{n_s}I_{ini}R_d$$

in item 2 of the formula (6). The voltage-adjusting parameter generating module 212 includes an adder that can eliminates the item $$\frac{n_p}{n_s}I_{ini}R_d$$

from the voltage vs (ts), in order to generate the auxiliary voltage Vaux(ts) value as shown in formula (7), and can output an voltage-adjusting parameter to the voltage adjuster 144, so that the output voltage Vo of the flyback converter (12 and 21) can be adjusted accordingly.

Figure 5:
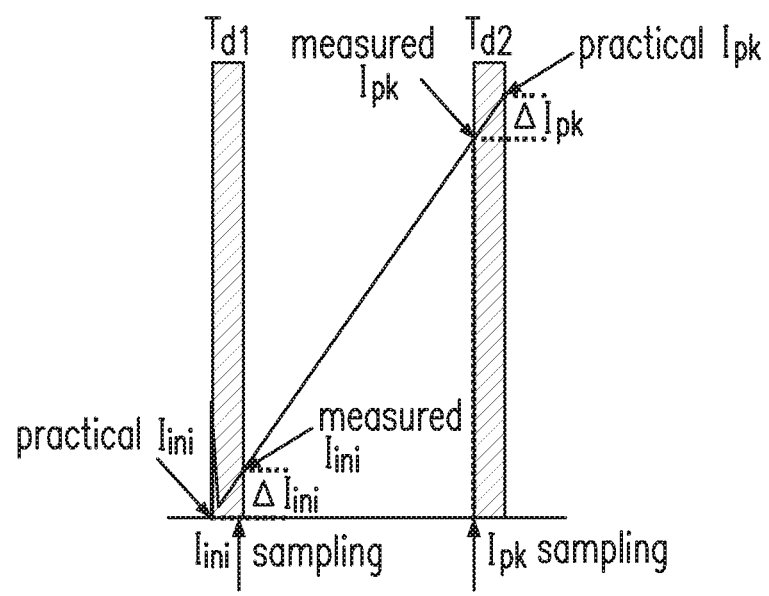
FIG. 5 is a schematic diagram showing a waveform of how to eliminate an error from the initial current value according to the preferred embodiment of the present disclosure.

Please refer to FIG. 5, which shows a waveform of how to eliminate an error from the initial current value Iini according to the preferred embodiment of the present disclosure. In FIG. 5, in order to prevent from a surge, the sampling time of the initial current value Iini is delayed for a first predetermined of time Td1, and a measured Iini is higher than a practical Iini with Δ $I_{ini}$. The initial current value $I_{ini}$ is detected at the first moment after the main switch S is turned on for a first predetermined duration Td1 to avoid the surge. In addition, because a control signal (not shown) for cutting off the main switch S has a transmission delay, a measured Ipk is lower than a practical Ipk with Δ Ipk. The peak current value $I_{PK}$ is detected at the second moment before the main switch S is turned off for a second predetermined duration Td2 to compensate an offset value due to a delay detection of the first predetermined duration Td1 on the initial current $I_{ini}$. The sampling error is cancelled when the first predetermined duration Td1 equals to the second predetermined duration Td2. Wherein:

$$\Delta I_{pk} = \frac{V_{in}}{L_m}T_{d2}$$

$$\Delta I_{ini} = \frac{V_{in}}{L_m}T_{d1}$$

$$I_0 = \frac{1}{T_s}\int_0^{T_s} i_d dt = \frac{T_d}{T_s}\frac{n}{2}(I_{ini} + \Delta I_{ini} + I_{PK} - \Delta I_{pk})$$

$$I_0 = \frac{1}{T_s}\int_0^{T_s} i_d dt = \frac{n}{2}\frac{T_d}{T_s}\left(I_{ini} + I_{PK} + \frac{V_{in}}{L_m}(T_{d1} + T_{d2})\right)$$

(8)

In the above equation (8), Td is the aforementioned Tdis, Lm is the magnetizing inductance, and when Td1=Td2, the last item of the above equation (8) is cancelled, i.e. the above sampling error is eliminated. The above loading in FIG. 3 is an LED module 13. However, it is only a loading of the preferred embodiment according to the present disclosure. The loading of the flyback converter system 2 can be any type of loading that can be applied to the flyback converter system 2.

EMBODIMENTS

1. A flyback converter having an output current and an output voltage comprises a transformer, a main switch, an output diode and a controller. The transformer includes a primary winding, a secondary winding and an auxiliary winding. The main switch is electrically connected to the primary winding. The output diode is electrically connected to the secondary winding. The controller includes a current-adjusting parameter generating module, a voltage-adjusting parameter generating module, a current adjuster and a voltage adjuster. The current-adjusting parameter generating module receives an initial current value at a time when the main switch is turned on, a peak current value at a time when the main switch is turned off, a conducting duration of the output diode and a first turns number ratio of the secondary winding to the primary winding to generate a current-adjusting parameter. The voltage-adjusting parameter generating module receives the initial current value, the first turns number ratio, a second turns number ratio of the auxiliary winding to the secondary winding, an output voltage value of the flyback converter, a conducted voltage drop value of the output diode and an equivalent resistance of the output diode to generate a voltage-adjusting parameter. The current adjuster adjusts the output current of the flyback converter according to the current-adjusting parameter. The voltage adjuster adjusts the output voltage of the flyback converter according to the voltage-adjusting parameter.

2. The flyback converter in Embodiment 1, wherein the output current $I_o$ is determined according to the following formula:

$$I_o = \frac{1}{T_s}\int_0^{T_s}i_d dt = \frac{T_{dis}}{T_s}\left(\frac{I_{ini} + I_{PK}}{2}\right)\frac{n_p}{n_s},$$

where $T_s$ denotes an operating cycle of the main switch, $i_d$ denotes a current value flowing through the output diode, $T_{dis}$ denotes the conducting duration of the output diode, $I_{ini}$ denotes the initial current value being detected when the main switch starts conducting, $I_{PK}$ denotes the peak current value being detected when the main switch ends conducting, $n_p$ denotes a turns number of the primary winding, and $n_s$ denotes a turns number of the secondary winding.

3. The flyback converter of any one of Embodiments 1-2, wherein the initial current value $I_{ini}$ is detected at a first moment after the main switch is turned on for a first predetermined duration to avoid a surge.

4. The flyback converter of any one of Embodiments 1-3, wherein the peak current value $I_{PK}$ is detected at a second moment before the main switch is turned off for a second predetermined duration to compensate an offset value resulting from a delay detection of the first predetermined duration on the initial current $I_{ini}$.

5. The flyback converter of any one of Embodiments 1-4, wherein the auxiliary winding has a mapping voltage $v_{aux}$ determined by the following formula:

$$v_{aux}(t_s) = \frac{n_{aux}}{n_s}(V_o + nI_{ini}R_d + V_F),$$

where $V_O$ denotes the output voltage value of the flyback converter, n denotes the first turns number ratio of the secondary winding to the primary winding, $n_{aux}$ denotes a third turns number of the auxiliary winding, $R_d$ denotes an equivalent series-connection resistance of the output diode and a secondary side circuit, and $V_F$ denotes the conducted voltage drop value of the output diode.

6. The flyback converter of any one of Embodiments 1-5, wherein the current-adjusting parameter generating module is a feedback current-trimming module, and the voltage-adjusting parameter generating module is a feedback voltage-trimming module.

7. A flyback converter comprises a primary side circuit, a secondary side circuit and a controller. The primary side circuit includes a primary winding and a main switch electrically connected to the primary winding. The secondary side circuit includes a secondary winding and an output diode electrically connected to the secondary winding and having a parasitic electrical parameter. The controller generates a correcting parameter for counteracting an effect on an output voltage of the flyback converter from the parasitic electrical parameter, wherein the parasitic electrical parameter is an equivalent series-connection resistance $R_d$ of the output diode and the secondary side circuit, and the correcting parameter is calculated based on the formula $$\frac{n_p}{n_s}I_{ini}R_d,$$

wherein $n_p$ denotes a turns number of the primary winding, $n_s$ denotes a turns number of the secondary winding, and $I_{ini}$ denotes an initial current value which is detected when the main switch is conducted.

8. The flyback converter in Embodiment 7, wherein the flyback converter further comprises an auxiliary winding having a mapping voltage $v_{aux}$, which is detected at a moment $t_s$ and determined by the following formula:

$$v_{aux}(t_s) = \frac{n_{aux}}{n_s}\left(V_o + \frac{n_p}{n_s}I_{ini}R_d + V_F\right),$$

wherein $n_{aux}$ denotes a turns number of the auxiliary winding, $V_o$ denotes an output voltage value of the flyback converter, and $V_F$ denotes a conducted voltage drop value of the output diode.

9. The flyback converter of any one of Embodiments 7-8, wherein the controller includes a feedback voltage-trimming module for generating the correcting parameter to trim a detected offset due to the parasitic electrical parameter.

10. The flyback converter of any one of Embodiments 7-9, further comprising a current-adjusting parameter generating module calculating a plurality of factors including the initial current value from the main switch to generate a current-adjusting parameter for adjusting an output current of the flyback converter, wherein the correcting parameter includes the current-adjusting parameter.

11. The flyback converter of any one of Embodiments 7-10, wherein the plurality of factors include an operating cycle $T_s$ of the main switch, a current value $i_d$ of a current flowing through the output diode, a conducting period $T_{dis}$ of the output diode, the initial current value $I_{ini}$ at a time when the main switch is turned on, a peak current value $I_{PK}$ being detected when the main switch is turned off, the turns number $n_p$ of the primary winding, the turns number $n_s$ of the secondary winding, and the output current of the flyback converter $I_o$ is determined according to the following formula:

$$I_o = \frac{1}{T_s}\int_0^{T_s} i_d dt = \frac{T_{dis}}{T_s}\left(\frac{I_{ini} + I_{PK}}{2}\right)\frac{n_p}{n_s}.$$

12. The flyback converter of any one of Embodiments 7-11, wherein: the flyback converter has an output current having a sampling error; the main switch has the initial current value $I_{ini}$ and the peak current value $I_{PK}$ of currents flowing there through at a first moment and a second moment respectively; the initial current value $I_{ini}$ is detected at the first moment after the main switch is turned on for a first predetermined duration to avoid a surge; the peak current value $I_{PK}$ is detected at the second moment before the main switch is turned off for the second predetermined duration to compensate an offset value due to a delay detection of the first predetermined duration on the initial current $I_{ini}$; and the sampling error is cancelled when the first predetermined duration equals to the second predetermined duration.

13. The flyback converter of any one of Embodiments 7-12, further comprising a voltage-adjusting parameter generating module calculating a plurality of factors including an initial current value from the main switch to generate a voltage-adjusting parameter for counteracting an effect on the output voltage of the flyback converter from the parasitic electrical parameter, wherein the correcting parameter includes the voltage-adjusting parameter.

14. The flyback converter of any one of Embodiments 7-14, wherein the flyback converter further comprises an auxiliary winding, the plurality of factors include the output voltage value $V_o$ of the flyback converter, a first turns number ratio n of the secondary winding to the primary winding, a turns number $n_{aux}$ of the auxiliary winding, an equivalent series-connection resistance $R_d$ of the output diode and the secondary side circuit, a conducted voltage drop value $V_F$ of the output diode and a mapping voltage $v_{aux}$ of the auxiliary winding, and the mapping voltage $v_{aux}$ is determined according to the following formula:

$$v_{aux}(t_s) = \frac{n_{aux}}{n_s}(V_o + nI_{ini}R_d + V_F).$$

15. The flyback converter of any one of Embodiments 7-15, wherein the flyback converter includes an auxiliary winding having a mapping voltage, and has an output current, and the controller has a detection timing to detect the output current and the mapping voltage in one of a DCM (discontinuous current mode) and a CCM (continuous current mode).

16. A method of controlling a flyback converter. The flyback converter has an output voltage, a primary side circuit and a secondary side circuit, wherein the primary side circuit includes a primary winding and a main switch electrically connected to the primary winding, and the secondary side circuit includes a secondary winding, the method of controlling the flyback converter comprises: providing an output diode having a parasitic electrical parameter; and providing a controller generating a correcting parameter for counteracting an effect on the output voltage of the flyback converter from the parasitic electrical parameter, wherein the parasitic electrical parameter is an equivalent series-connection resistance $R_d$ of the output diode and the secondary side circuit, and the correcting parameter is calculated based on the formula $$\frac{n_p}{n_s}I_{ini}R_d,$$

wherein $n_p$ denotes a turns number of the primary winding, $n_s$ denotes a turns number of the secondary winding, and $I_{ini}$ denotes an initial current value which is detected when the main switch is conducted.

17. The method in Embodiment 16, wherein the controller includes a current-adjusting parameter generating module, and a voltage-adjusting parameter generating module, and the method further comprises: providing a transformer including the primary winding, the secondary winding, an auxiliary winding, the main switch connected to the primary winding and the output diode electrically connected to the secondary winding, wherein: the main switch has the initial current value and a peak current value, the output diode has a conducting duration, a conducting voltage drop value and an equivalent resistance; the flyback converter has an output current; a first turns number ratio is defined as the secondary turns number to the primary turns number; a second turns number ratio is defined as the turns number of the auxiliary winding to the secondary winding turns number; the current-adjusting parameter generating module receives the initial current value and the peak current value, and generates a current-adjusting parameter for adjusting the output current of the flyback converter based on the conduction duration and the first turns number ratio; and the voltage-adjusting parameter generating module receives the initial current value, the peak current value and the output voltage, and generates a voltage-adjusting parameter for adjusting the output voltage of the flyback converter based on the first turns number ratio, the second turns number ratio and the equivalent series-connection resistance.

18. The method of any one of Embodiments 16-17, wherein the output current $I_o$ is determined according to the following formula:

$$I_o = \frac{1}{T_s}\int_0^{T_s} i_d dt = \frac{T_{dis}}{T_s}\left(\frac{I_{ini}+I_{PK}}{2}\right)\frac{n_p}{n_s},$$

where $T_s$ denotes an operating cycle of the main switch, $i_d$ denotes a current value flowing through the output diode, $T_{dis}$ denotes the conduction duration of the output diode, $I_{ini}$ denotes the initial current value being detected when the main switch starts conducting, $I_{PK}$ denotes the peak current value being detected when the main switch ends conducting, $n_p$ denotes the first turns number of the primary winding, and $n_s$ denotes the second turns number of the secondary winding.

19. The method of any one of Embodiments 7-15, wherein the auxiliary winding has a mapping voltage $v_{aux}$ determined by the following formula:

$$v_{aux}(t_s) = \frac{n_{aux}}{n_s}(V_o + nI_{ini}R_d + V_F),$$

where $V_o$ denotes the output voltage value of the flyback converter, n denotes the first turns number ratio of the secondary winding to the primary winding, $n_{aux}$ denotes a third turns number of the auxiliary winding, $R_d$ denotes the equivalent series-connection resistance of the output diode and the secondary side circuit, and $V_F$ denotes the conducting voltage drop value of the output diode.

20. The method of any one of Embodiments 16-19, wherein: the flyback converter has an output current having a sampling error; the main switch has the initial current value $I_{ini}$ and a peak current value $I_{PK}$ of currents flowing there through at a first moment and a second moment respectively; the initial current value $I_{ini}$ is detected at the first moment after the main switch is turned on for a first predetermined duration to avoid a surge; the peak current value $I_{PK}$ is detected at the second moment before the main switch is turned off for a second predetermined duration to compensate an offset value due to a delay detection of the first predetermined duration on the initial current $I_{ini}$; the sampling error is cancelled when the first predetermined duration equals to the second predetermined duration; and the controller has a detection timing to detect an output current and a mapping voltage of the flyback converter in one of a DCM (discontinuous current mode) and a CCM (continuous current mode).

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A flyback converter having an output current and an output voltage, comprising:
   a transformer including a primary winding, a secondary winding and an auxiliary winding;
   a main switch electrically connected to the primary winding;

an output diode electrically connected to the secondary winding; and
a controller, including:
  a current-adjusting parameter generating module receiving an initial current value at a time when the main switch is turned on, a peak current value at a time when the main switch is turned off, a conducting duration of the output diode and a first turns number ratio of the secondary winding to the primary winding to generate a current-adjusting parameter;
  a voltage-adjusting parameter generating module receiving the initial current value, the first turns number ratio, a second turns number ratio of the auxiliary winding to the secondary winding, an output voltage value of the flyback converter, a conducted voltage drop value of the output diode and an equivalent resistance of the output diode to generate a voltage-adjusting parameter;
  a current adjuster adjusting the output current of the flyback converter according to the current-adjusting parameter; and
  a voltage adjuster adjusting the output voltage of the flyback converter according to the voltage-adjusting parameter.

2. The flyback converter as claimed in claim 1, wherein the output current $I_o$ is determined according to the following formula:

$$I_o = \frac{1}{T_s}\int_0^{T_s} i_d dt = \frac{T_{dis}}{T_s}\left(\frac{I_{ini}+I_{PK}}{2}\right)\frac{n_p}{n_s},$$

where $T_s$ denotes an operating cycle of the main switch, $i_d$ denotes a current value flowing through the output diode, $T_{dis}$ denotes the conducting duration of the output diode, $I_{ini}$ denotes the initial current value being detected when the main switch starts conducting, $I_{PK}$ denotes the peak current value being detected when the main switch ends conducting, $n_p$ denotes a turns number of the primary winding, and $n_s$ denotes a turns number of the secondary winding.

3. The flyback converter as claimed in claim 1, wherein the auxiliary winding has a mapping voltage $V_{aux}$ determined by the following formula:

$$v_{aux}(t_s) = \frac{n_{aux}}{n_s}(V_o + nI_{ini}R_d + V_F),$$

where $V_O$ denotes the output voltage value of the flyback converter, n denotes the first turns number ratio of the secondary winding to the primary winding, $n_{aux}$ denotes a third turns number of the auxiliary winding, $R_d$ denotes an equivalent series-connection resistance of the output diode and a secondary side circuit, and $V_F$ denotes the conducted voltage drop value of the output diode.

4. The flyback converter as claimed in claim 1, wherein the current-adjusting parameter generating module is a feedback current-trimming module, and the voltage-adjusting parameter generating module is a feedback voltage-trimming module.

5. The flyback converter as claimed in claim 2, wherein:
the initial current value $I_{ini}$ is detected at a first moment after the main switch is turned on for a first predetermined duration to avoid a surge.

6. The flyback converter as claimed in claim 5, wherein:
the peak current value $I_{PK}$ is detected at a second moment before the main switch is turned off for a second predetermined duration to compensate an offset value resulting from a delay detection of the first predetermined duration on the initial current $I_{ini}$.

7. A flyback converter comprising:
a primary side circuit including a primary winding and a main switch electrically connected to the primary winding;
a secondary side circuit including a secondary winding and an output diode electrically connected to the secondary winding and having a parasitic electrical parameter; and
a controller generating a correcting parameter for counteracting an effect on an output voltage of the flyback converter from the parasitic electrical parameter, wherein the parasitic electrical parameter is an equivalent series-connection resistance $R_d$ of the output diode and the secondary side circuit, and the correcting parameter is calculated based on the formula $$\frac{n_p}{n_s}I_{ini}R_d,$$

wherein $n_p$ denotes a turns number of the primary winding, $n_s$ denotes a turns number of the secondary winding, and $I_{ini}$ denotes an initial current value which is detected when the main switch is conducted.

8. The flyback converter as claimed in claim 7, wherein the flyback converter further comprises an auxiliary winding having a mapping voltage $v_{aux}$, which is detected at a moment $t_s$ and determined by the following formula:

$$v_{aux}(t_s) = \frac{n_{aux}}{n_s}\left(V_o + \frac{n_p}{n_s}I_{ini}R_d + V_F\right),$$

wherein $n_{aux}$ denotes a turns number of the auxiliary winding, $V_o$ denotes an output voltage value of the flyback converter, and $V_F$ denotes a conducted voltage drop value of the output diode.

9. The flyback converter as claimed in claim 7, wherein the controller includes a feedback voltage-trimming module for generating the correcting parameter to trim a detected offset due to the parasitic electrical parameter.

10. The flyback converter as claimed in claim 7, further comprising a current-adjusting parameter generating module calculating a plurality of factors including the initial current value from the main switch to generate a current-adjusting parameter for adjusting an output current of the flyback converter, wherein the correcting parameter includes the current-adjusting parameter.

11. The flyback converter as claimed in claim 7, further comprising a voltage-adjusting parameter generating module calculating a plurality of factors including an initial current value from the main switch to generate a voltage-adjusting parameter for counteracting an effect on the output voltage of the flyback converter from the parasitic electrical parameter, wherein the correcting parameter includes the voltage-adjusting parameter.

12. The flyback converter as claimed in claim 7, wherein the flyback converter includes an auxiliary winding having a mapping voltage, and has an output current, and the controller has a detection timing to detect the output current and the mapping voltage in one of a DCM (discontinuous current mode) and a CCM (continuous current mode).

13. The flyback converter as claimed in claim 10, wherein the plurality of factors include an operating cycle $T_s$ of the main switch, a current value $i_d$ of a current flowing through the output diode, a conducting period $T_{dis}$ of the output diode, the initial current value $I_{ini}$ at a time when the main switch is turned on, a peak current value $I_{PK}$ being detected when the main switch is turned off, the turns number $n_p$ of the primary winding, the turns number $n_s$ of the secondary winding, and the output current of the flyback converter $I_o$ is determined according to the following formula:

$$I_o = \frac{1}{T_s}\int_0^{T_s} i_d dt = \frac{T_{dis}}{T_s}\left(\frac{I_{ini}+I_{PK}}{2}\right)\frac{n_p}{n_s}.$$

14. The flyback converter as claimed in claim 11, wherein the flyback converter further comprises an auxiliary winding, the plurality of factors include the output voltage value $V_o$ of the flyback converter, a first turns number ratio n of the secondary winding to the primary winding, a turns number $n_{aux}$ of the auxiliary winding, an equivalent series-connection resistance $R_d$ of the output diode and the secondary side circuit, a conducted voltage drop value $V_F$ of the output diode and a mapping voltage $v_{aux}$ of the auxiliary winding, and the mapping voltage $v_{aux}$ is determined according to the following formula:

$$v_{aux}(t_s) = \frac{n_{aux}}{n_s}(V_o + nI_{ini}R_d + V_F).$$

15. The flyback converter as claimed in claim 13, wherein:
the flyback converter has an output current having a sampling error;
the main switch has the initial current value $I_{ini}$ and the peak current value $I_{PK}$ of currents flowing there through at a first moment and a second moment respectively;
the initial current value $I_{ini}$ is detected at the first moment after the main switch is turned on for a first predetermined duration to avoid a surge;
the peak current value $I_{PK}$ is detected at the second moment before the main switch is turned off for the second predetermined duration to compensate an offset value due to a delay detection of the first predetermined duration on the initial current $I_{ini}$; and
the sampling error is cancelled when the first predetermined duration equals to the second predetermined duration.

16. A method of controlling a flyback converter having an output voltage, a primary side circuit and a secondary side circuit, wherein the primary side circuit includes a primary winding and a main switch electrically connected to the primary winding, and the secondary side circuit includes a secondary winding, the method comprising:
providing an output diode having a parasitic electrical parameter; and
providing a controller generating a correcting parameter for counteracting an effect on the output voltage of the flyback converter from the parasitic electrical parameter, wherein the parasitic electrical parameter is an equivalent series-connection resistance $R_d$ of the output diode and the secondary side circuit, and the correcting parameter is calculated based on the formula $$\frac{n_p}{n_s}I_{ini}R_d,$$

wherein $n_p$ denotes a turns number of the primary winding, $n_s$ denotes a turns number of the secondary winding, and $I_{ini}$ denotes an initial current value which is detected when the main switch is conducted.

17. The method as claimed in claim 16, wherein the controller includes a current-adjusting parameter generating module, and a voltage-adjusting parameter generating module, and the method further comprises:
providing a transformer including the primary winding, the secondary winding, an auxiliary winding, the main switch connected to the primary winding and the output diode electrically connected to the secondary winding, wherein:
the main switch has the initial current value and a peak current value, the output diode has a conducting duration, a conducting voltage drop value and an equivalent resistance; the flyback converter has an output current; a first turns number ratio is defined as the secondary winding to the primary winding; a second turns number ratio is defined as the turns number of the auxiliary winding to the turns number of secondary winding;
the current-adjusting parameter generating module receives the initial current value and the peak current value, and generates a current-adjusting parameter for adjusting the output current of the flyback converter based on the conduction duration and the first turns number ratio; and
the voltage-adjusting parameter generating module receives the initial current value, the peak current value and the output voltage, and generates a voltage-adjusting parameter for adjusting the output voltage of the flyback converter based on the first turns number ratio, the second turns number ratio and the equivalent series-connection resistance.

18. The method as claimed in claim 16, wherein:
the flyback converter has an output current having a sampling error;
the main switch has the initial current value $I_{ini}$ and a peak current value $I_{PK}$ of currents flowing there through at a first moment and a second moment respectively;
the initial current value $I_{ini}$ is detected at the first moment after the main switch is turned on for a first predetermined duration to avoid a surge;
the peak current value $I_{PK}$ is detected at the second moment before the main switch is turned off for a second predetermined duration to compensate an offset value due to a delay detection of the first predetermined duration on the initial current $I_{ini}$;
the sampling error is cancelled when the first predetermined duration equals to the second predetermined duration; and
the controller has a detection timing to detect an output current and a mapping voltage of the flyback converter in one of a DCM (discontinuous current mode) and a CCM (continuous current mode).

19. The method as claimed in claim 17, wherein:
the output current $I_o$ is determined according to the following formula:

$$I_o = \frac{1}{T_s}\int_0^{T_s} i_d dt = \frac{T_{dis}}{T_s}\left(\frac{I_{ini}+I_{PK}}{2}\right)\frac{n_p}{n_s},$$

where $T_s$ denotes an operating cycle of the main switch, $i_d$ denotes a current value flowing through the output diode, $T_{dis}$ denotes the conduction duration of the output diode, $I_{ini}$ denotes the initial current value being detected when the main switch starts conducting, $I_{PK}$ denotes the peak current value being detected when the main switch ends conducting, $n_p$ denotes the turns number of the primary winding, and $n_s$ denotes the turns number of the secondary winding.

20. The method as claimed in claim 17, wherein:
the auxiliary winding has a mapping voltage $v_{aux}$ determined by the following formula:

$$v_{aux}(t_s) = \frac{n_{aux}}{n_s}(V_o + nI_{ini}R_d + V_F),$$

where $V_o$ denotes the output voltage value of the flyback converter, n denotes the first turns number ratio of the secondary winding to the primary winding, $n_{aux}$ denotes a third turns number of the auxiliary winding, $R_d$ denotes the equivalent series-connection resistance of the output diode and the secondary side circuit, and $V_F$ denotes the conducting voltage drop value of the output diode.

\* \* \* \* \*